United States Patent
Knight et al.

(10) Patent No.: US 6,274,647 B1
(45) Date of Patent: Aug. 14, 2001

(54) INTUMESCENT MATERIAL

(75) Inventors: Diane S. Knight; Simon Pinch; Nigel Julian Walker, all of Kendal (GB)

(73) Assignee: Technical Fibre Products Limited, Kendal (GB)

( * ) Notice: Subject to any disclaimer, the term of this patent is extended or adjusted under 35 U.S.C. 154(b) by 0 days.

(21) Appl. No.: 09/283,932

(22) Filed: Apr. 1, 1999

(51) Int. Cl.$^7$ .................................................. C08K 3/00
(52) U.S. Cl. .................... 523/179; 524/443; 524/444; 524/494; 428/292.1
(58) Field of Search .......................... 523/179; 524/443, 524/444, 494; 428/292.1

(56) References Cited

U.S. PATENT DOCUMENTS

| | | |
|---|---|---|
| 5,340,643 | 8/1994 | Ou et al. . |
| 5,384,188 | 1/1995 | Lebold et al. . |

FOREIGN PATENT DOCUMENTS

| | | | |
|---|---|---|---|
| 0 735 187 A | 10/1996 | (EP) . | |
| 2 233 678 A | 1/1991 | (GB) . | |
| 2233678A | 1/1991 | (GB) | ............................. D21H/17/67 |
| 2 271 362 A | 4/1994 | (GB) . | |
| 2271362A | 4/1994 | (GB) | ............................. D21H/21/00 |
| 2 273 100 A | 6/1994 | (GB) . | |
| WO 80/01576 | 8/1980 | (WO) | ............................. D04H/1/58 |
| WO 97/02219 | 1/1997 | (WO) | ............................. C04B/30/02 |

*Primary Examiner*—Edward J. Cain
(74) *Attorney, Agent, or Firm*—Clifford W. Browning; Woodard, Emhardt, Naughton, Moriarty & McNett, Patent and Trademark Attorneys

(57) ABSTRACT

A flexible intumescent material which comprises inorganic fibers and flexible organic fibers together forming a predominantly fibrous matrix, an elastomeric binder and an intumescent substance and which has been compressed at a moisture content of less than 5% by weight. The intumescent material may be produced by wet laying an aqueous slurry of inorganic fibers, flexible organic fibers, the intumescent substance and the elastomeric binder onto a water-pervious support, withdrawing water from the slurry to form a sheet, drying the sheet to a moisture content of less then 5% by weight and then compressing the sheet material.

20 Claims, No Drawings

INTUMESCENT MATERIAL

The present invention relates to a flexible intumescent material for use in passive fire protection and relates also to a method for the manufacture of such a material.

Flexible intumescent materials (e.g. in the form of a sheet or a strip) are being increasingly used for a variety of passive fire protection applications. Such material may be produced on paper-making equipment and comprise a predominantly fibrous matrix (e.g. a bonded fibrous web) loaded with an intumescent substance (e.g. exfoliating graphite), In use, the intumescent material is applied to a surface to be protected by any suitable means, e.g. by use of adhesive. The surface may for example be around the edge of a door. In the event of a fire, the presence of the intumescent substance causes the product to expand in a multiplicity of direction so as to form a seal and provide for protection against fire.

One such material is disclosed in GB-A-2 273 100 and is comprised of rockwvool fibres, elastomeric binder and exfoliating graphite. The intumescent material of GB-A-2 273 100 is produced by wet-laying an aqueous suspension incorporating tockwool fibres, an elastometic binder and exfoliating graphite on a forming fabric such as used for paper-making, and withdrawing water from the suspension to form a sheet which is then dried. Although not specifically disclosed in GB-A-2 273 100, it would be conventional practice to consolidate the sheet through rollers prior to drying. Such consolidation has the primary aim of removing water and is not used to control density and thickness of the finished product. The moisture content after consolidation is not less than 40% and after drying is typically less than 5%.

GB-A-2 271 362 also relates to the production of intumescent sheet material and does disclose consolidation of the web prior to final drying. The intumescent material disclosed in GB-A-2 271 362 is however of a different nature from that disclosed in GBA-2 273 100 in that the former has a matrix whose predominant ingredient is an unfired kaolinitic clay comprising ball clay reinforced by inorganic vitreous fibres, said material including an organic binder and optionally also incorporating rayon fibres.

The ultimate performance of the intumescent material in terms of its volume expansion and pressure generating capability an exposure to a fire is directly related to the density of the material and this is usually a function of the abilit3 of the paper-making equipment to hold the intumescent substances There is a limit to the density of material which may be produced by a papermaking process.

There is a demand for thin, flexible intumescent products with high volume expansion and pressure generating capability in order to meet the needs of increasingly sophisticated and demanding fire protection industry.

According to a first aspect of the present invention there is provided a flexible intumescent material which comprises inorganic fibres and flexible organic fibres together forming a predominantly fibrous matrix, an elastomeric binder and an intuinescent substance and which has been compressed at a moisture content of less than 5% by weight.

According to a second aspect of the present invention there is provided a method of producing a flexible intumescent material comprised of a predominantly fibrous matrix, the method comprising wet laying an aqueous slurry of inorganic fibres, flexible organic fibres, an intumescent substance and an elastomeric binder onto a water-pervious support, withdrawing water from the slurry to form a sheet, drying the sheet to a moisture content of less then 5% by weight and then compressing the sheet material.

According to a third aspect of the present invention there is provided a method of producing a flexible intumescent material comprising compressing a wet-laid sheet material having a moisture content of less than 5% by weight and being comprised of a matrix formed predominantly of fibres provided by inorganic fibres and flexible organic fibres, an elastomeric binder and an intumescent substance.

In accordance with the invention, we have found that the volume expansion and pressure generation of wet-laid intumescent materials having a predominantly fibrous matrix incorporating inorganic fibres loaded with an intumescent substance can be considerably improved by including flexible organic fibres in the suspension to be wet-laid, and effecting compression once the resulting sheet material has been dried to a moisture content of less than 5% by weight (usually less than 2% by weight). The improvement in properties is obtained particularly by the inclusion of the flexible organic fibres which allows a compressed product of increased density to be produced and the above advantages to be obtained. In contrast, the intumescent material of GB-A-2 273 100 (which does not incorporate flexible organic fibres) becomes unworkable and crushes during a compression process so is no longer suitable for use in passive fire protection applications, The compression step employed in the present invention (effected on a material having a moisture content of less than 5% by weight) is to be distinguished from the consolidation step effected prior to drying during production of intumescent sheet material described above in relation to the prior art. For such consolidation steps, the moisture content of the sane would be considerably above 5% by weight (e.g. 40% by weight) and the consolidation would not be effective to achieve the improvement of volume expansion and pressure generation properties achieved by the present invention.

An intumescent material in accordance with the first aspect of the invention (which may be produced in accordance with the methods of the second or third aspects) will typically have a thickness of from 0.25 to 5 mm and a density of 500 to 2,000 kg m$^{-3}$. The material will typically have a volume expansion ratio of from 15:1 to 50:1 when tested for free expansion by heating in a furnace at 400° C. for 15 to 30 minutes. In contrast, prior to compression, the material will typically have a thickness of 0.5 to 12 mm, a density of 150 to 400 kgm$^{-3}$ and a volume expansion ratio of from 3:1 to 15:1. The tensile strength of the material prior to compression must be sufficient to allow this operation to be effected and is typically not less than 3 kN m$^{-2}$.

The compression process allows the properties of the intumescent material to be controlled, Typically, the material will be compressed to 20% to 75% of its original thickness. Compression may be effected using a press, e.g. a platen type press but is more conveniently carried by calendering, i.e. by passing the material to be compressed through the nip between two rollers using conventional techniques. The degree of compression and the thickness of the finished product may be controlled by fixing the gap between the rollers and applying a pressure thereto sufficient to overcome the resilience of the material being compressed. Calenders which are used for rubber processing are particularly suitable for production of the calendered material. Alternatively, calenders designed for use with paper, textiles or non-woven materials may also be used. The rollers used for calendering may be smoothed or patterned and may be heated, chilled or at ambient temperature.

In an alternative embodiment of the invention the material to be compressed may be impregnated vital a thermosetting resin and compressed in a high pressure mould under conditions resulting in curing of the resin. The thermosetting resin may for example be a epoxy, polyester, vinyl ester, phenolic, melanine or acrylate resin.

Typically, the intumescent material of the first aspect of the invention will comprise 2 to 20% (preferably 2 to 8%) by weight of the organic fibres which may for example have a length of 3 to 25 mm and a diameter of 2 to 20 microns. Particularly suitable organic fibres for use in the invention include polyester, nylon, aramid, acrylic, olefin and cellulosic fibres.

It is particularly preferred that the organic fibres are of a thermoplastic polymer designed to melt and flow during the compression (e.g. calendering) process so as to result in melt bonding of the fibres. Suitable fibres for this purpose are olefin fibres, and polyester fibres as well as bi-component fibres which comprise two polymers with dissimilar melting points. The melt bonding is advantageous because it leads to a product of improved integrity and through-plane strength.

Inorganic fibres for use in the product of the invention may for example be glass, mineral wool, rockwool, slag wool, asbestos, ceramic, zirconia, alumina or other man made vitreous fibres. Generally the inorganic fibres will be present in the intumescent material in an amount of 10 to 80% (preferably 20 to 40%) by weight. Typically the inorganic fibres will have a length of 0.2 to 20 mm and a diameter of 0.1 to 15 microns.

The intumescent substance may be an exfoliating material, e.g. expandable (intercalated) graphite, vermiculite, and perlite, Generally the intumescent material of the first aspect of the invention will comprise 10 to 85% (preferably 40 to 70%) by weight of the intumescent substance.

The aqueous elastomeric binder may for example comprise an acrylic, butadiene, vinyl or silicone polymer. It is preferred to use an acrylic latex. The intumescent material will typically comprise 2 to 30% (preferably 5 to 20%) by weight of the binder.

Intumescent materials in accordance with the invention may have been produced by using high speed mixing to prepare a dispersion of the exfoliating substance, organic fibres, inorganic fibres and binder (in the requisite proportions) in water. Typically this dispersion will comprise from 0.1 to 3.0% by weight of solids. The dispersion is then formed into a sheet material using standard paper-making techniques and dried to a water content of less than 5% by weight (usually less than 2% by weight). The resultant sheet material is then compressed as detailed more fully above.

The intumescent material of the invention may be used in passive fire situations in an entirely conventional manner, e.g. by fixing the material using an adhesive, to a surface to be protected.

The invention is illustrated by the following non-limiting Examples.

EXAMPLE 1

Using standard paper-making techniques, a sheet of the following composition was produced:

| Component | Weight Percent |
| --- | --- |
| INORPHIL (rockwool fibre) | 30 |
| GRILENE NV2 (polyester fibre) | 5 |
| Intercalated Graphite | 55 |
| Acrylic latex binder | 10 |
| Moisture | <2 |

The sheet had the following characteristics:

| | |
| --- | --- |
| Basis weight | 1300 gm$^{-2}$ |
| Thickness | 4 mm |
| Tensile strength | 5.3 kNm$^{-2}$ |
| Expansion ratio | 10:1 |

For convenience, this sheet material is referred to below as the "non-calendered sheet material".

The non-calendered sheet material was passed through a rubber processing calender, comprising two stainless steel rolls of 2 m width and applied load 3 tonnes. The gap between the rolls was fixed at 1.6 mm and the line speed was 5 m/min. Sheets thus compressed had the following characteristics:

| | |
| --- | --- |
| Basis weight | 1300 gm$^{-2}$ |
| Thickness | 1.8 mm |
| Tensile strength | 2.5 kNm$^{-2}$ |
| Expansion ratio | 20:1 |

EXAMPLE 2

The non-calendered sheet material produced as described in Example 1, was passed through a rubber processing calender, comprising two stainless steel rolls of 2 m width and applied load 3 tonnes. The gap between the rolls was fixed at 0.8 mm and the line speed was 5 m/min. Sheets thus compressed had the following characteristics:

| | |
| --- | --- |
| Basis weight | 1300 gm$^{-2}$ |
| Thickness | 1.0 mm |
| Tensile strength | 1.5 kNm$^{-2}$ |
| Expansion ratio | 30:1 |

EXAMPLE 3

The non-calendered sheet material produced as described in Example 1, was impregnated with 1300 gm$^2$ of epoxy resin, mixed with dicyandiamide hardener. The resulting mat was pressed and cured in an hydraulic sheet press at a temperature of 200° C. for 5 minutes. The material thus produced had the following characteristics.

| | |
| --- | --- |
| Basis weight | 2600 gm$^{-2}$ |
| Thickness | 0.5 mm |
| Tensile strength | 15 kNm$^{-2}$ |
| Expansion ratio | 40:1 |

What is claimed is:

1. A flexible intumescent material which comprises inorganic fibres and flexible organic fibres together forming a predominantly fibrous matrix, an elastorneric binder and an intumescent substance and which has been compressed at a moisture content of less than 5% by weight.

2. A material as claimed in claim 1 having a thickness of 0.25 to 5 mm.

3. A material as claimed in claim 1 having a density of 500 to 2,000 kg m$^{-3}$.

4. A material as claimed in claim 1 having a volume expansion ratio of from 15:1 to 50:1 when tested for fire expansion by heating in a furness at 400° C. for 15 to 30 minutes.

5. A material as claimed in claim 1 which comprises 2 to 20% by weight of the organic fibres.

6. A material as claimed in 1 wherein the organic fibres are polyester, nylon, aramid, acrylic, olefin or cellulosic fibres.

7. A material as claimed in claim 1 wherein the organic fibres are melt bonded together.

8. A material as claimed in claim 1 comprising 10 to 80% by weight of the inorganic fibres.

9. A material as claimed in claim 1 wherein the inorganic fibres are glass, mineral wool, rockwool, slag wool, asbestos, ceramic, zirconia, alumina or other man made vitreous fibres.

10. A material as claimed in claim 1 containing 10 to 85% by weight of the intumescent substance.

11. A material as claimed in claim 1 wherein the intumescent substance is an exfoliating material.

12. A material as claimed in claim 11 wherein the exfoliating material is expandable graphite, vermiculite, or perlite.

13. A material as claimed in claim 1 comprising 2 to 30% by weight of the binder.

14. A material as claimed in claim 1 wherein the binder is an acrylic, butadiene, 2vinyl or silicone polymer.

15. A method of producing a flexible intumescent material comprised of a predominantly fibrous matrix, the method comprising wet laying an aqueous slurry of inorganic fibres, flexible organic fibres, an intumescent substance and an elastomeric binder onto a water-pervious support, withdrawing water from the slurry to form a sheet, drying the sheet to a moisture content of less then 5% by weight and then compressing the sheet material.

16. A method as claimed in claim 15 wherein the compression is effected by calendering.

17. A method as claimed in claim 15 wherein prior to compression the sheet is treated with a thermosetting resin and compression is effected under conditions resulting in curing of the resin.

18. A method as claimed in claim 15 for producing a product as claimed in claim 1.

19. A method as claimed in claim 15 wherein the sheet is compressed to 20% to 75% of its thickness.

20. A method of producing a flexible intumescent material comprising compressing a wet-laid sheet material having a moisture content of less than 5% by weight and being comprised of a matrix formed predominantly of fibres provided by inorganic fibres and flexible organic fibres, an elastomeric binder and an intumescent substance.

* * * * *